C. E. DROWN.
VALVE.
APPLICATION FILED NOV. 30, 1908.

950,204.

Patented Feb. 22, 1910.

Inventor
C. E. Drown.

Witnesses

Attorney

UNITED STATES PATENT OFFICE.

CURTIS E. DROWN, OF TUCSON, ARIZONA TERRITORY.

VALVE.

950,204.  Specification of Letters Patent.  Patented Feb. 22, 1910.

Application filed November 30, 1908. Serial No. 465,162.

*To all whom it may concern:*

Be it known that I, CURTIS E. DROWN, citizen of the United States, residing at Tucson, in the county of Pima and Territory of Arizona, have invented certain new and useful Improvements in Valves, of which the following is a specification.

This invention relates to valves, and has for its object to provide an improved rotary valve which requires no packing and in which the pressure of the fluid will assist in holding the valve closed.

The valve can take the place of any ordinary globe or plug valve and has advantages of simplicity and cheapness as will be more fully apparent from the following description.

An embodiment of the invention is illustrated in the accompanying drawings in which—

Figure 1:
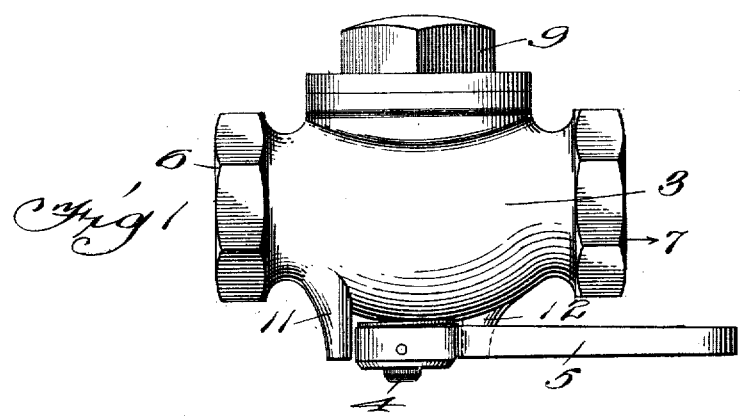
Figure 2:
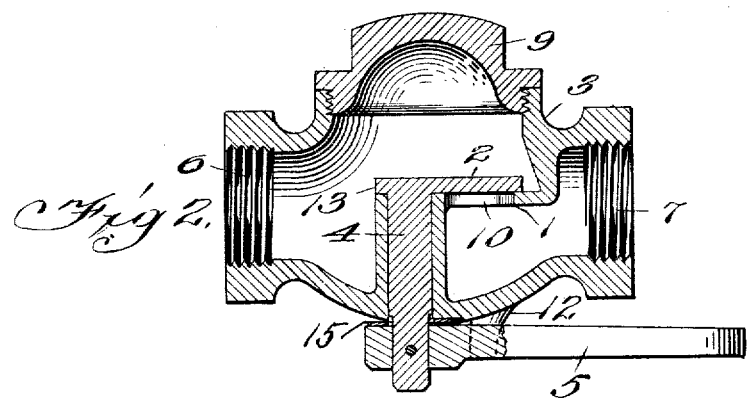
Figure 3:
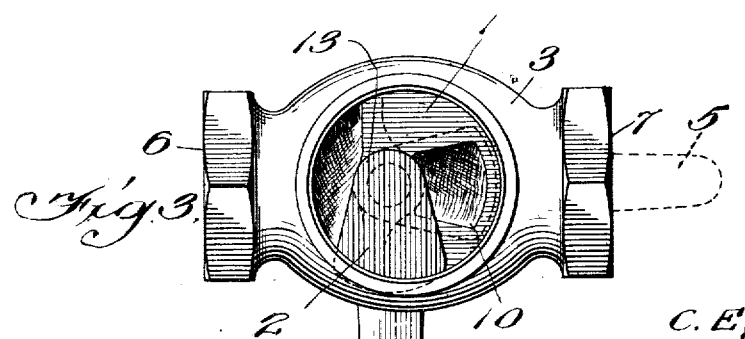

Figure 1 is a side view of the valve; Fig. 2 is a central longitudinal section; Fig. 3 is a top plan view with the cap of the valve removed.

The casing 3 of the valve is somewhat similar to that of an ordinary globe valve, and may be varied according to circumstances or in any manner desired. The inlet is indicated at 6 and the outlet at 7, and a cap 9 screwed into the top may be removed for access to the interior thereof when desired. A diaphragm extends across within the body of the valve, said diaphragm being indicated at 1 and provided with a segmental opening 10 therein. This diaphragm forms the seat, and is machined or planed flat on one side and ground down true to form a smooth and even seat.

The valve consists of a segmental plate or piece 2 the under surface of which is ground to fit closely against the valve seat 1, and which is of proper size and shape to cover the opening 10 when the valve is closed. This valve 2 is provided with a stem 4 extending through the wall of the valve casing on the side opposite to the cap 9, and said stem is provided with a handle 5 whereby it may be turned. The bearing for the valve stem is conveniently formed in an enlarged or thickened portion of the diaphragm or partition which extends across the valve body. Stops 11 and 12 limit the turn of the handle, at open and closed position respectively.

The valve 2 is located on the pressure side, and it projects outwardly around the stem, on all sides, as indicated at 13, the projecting shoulder forming a tight joint which prevents any leak beside the valve stem and makes the use of packing unnecessary. The valve 2 swings or turns to open or closed position, and a quarter turn will give a full opening, by completely uncovering the opening 10. In consequence of the pressure a close contact is maintained between the valve and the valve seat, the stem being sufficiently loose to allow the valve to be pressed into contact with the seat at all times, and the pressure not only assists in holding the valve closed, but also assists in preventing leakage through the valve or beside the valve stem.

The valve may be used for steam, water, air, or other fluids, and it acts very quickly both in opening and closing. There is no packing to wear out, and wear on the valve makes no difference since it will always press tightly to its seat. Inasmuch as the valve swings over the opening from the side, there is little or no possibility of grit being caught under the valve, as with valves which move toward and from their seats. Injury to a valve or valve seat is frequently caused by catching grit or dirt between the valve and seat, and, the valve being then pressed hard to prevent the leak, the seat or the valve will be dented, and so soon ruined. With the present valve, it turns or sweeps over the seat, whereby grit or the like will be wiped or swept off, and the valve cannot thus be injured in the manner indicated. The use of washers and the like is unnecessary, since the two smooth contacting surfaces, in consequence of the pressure, will form a tight valve, and the parts will tend to wear smooth, rather than otherwise. Of course packing may be provided around the stem if desired, but will ordinarily be unnecessary. The use of washers or packing on the face of the valve, which require frequent replacing and constitute the chief objection to an ordinary globe valve, is entirely obviated. A spring washer 15 is preferably located between the handle and the casing.

I claim:

A valve comprising a casing with a diaphragm across the same provided with a central opening and a plane surface around the same forming a valve seat, a partition connecting said diaphragm with the base of the casing, provided with a bore leading through the said casing base, a segmental turning valve-plate on the upper pressure or inlet side of the diaphragm and provided with a plane face resting upon and against said seat, and a stem projecting from said plate downwardly through said diaphragm bore, the said plate projecting beyond the upper end of said stem entirely therearound to form a tight joint around the upper end of the said bore, and a handle upon the lower outer end of said stem.

In testimony whereof, I affix my signature in presence of two witnesses.

CURTIS E. DROWN.

Witnesses:
 CHARLES G. FULLER,
 PAUL GATLIN.